(12) United States Patent
Huziwara et al.

(10) Patent No.: US 7,988,924 B2
(45) Date of Patent: Aug. 2, 2011

(54) DEVICE AND PROCESS FOR DISTRIBUTION OF MIXED CHARGES ONTO FIXED BEDS OF CATALYST IN DESCENDING-FLOW REACTORS

(75) Inventors: Wilson Kenzo Huziwara, Rio de Janeiro (BR); Donizeti Aurelio Silva Belato, Rio de Janeiro (BR); Jose Antonio Vidal Vieira, Rio de Janeiro (BR); Angelo Jose Gugelmin, São Mateus do Sul (BR); Shelton Rolim Cercal, São Mateus do Sul (BR); Jorilvaldo Medeiros, Rio de Janeiro (BR); William Victor Carlos Candido, São Mateus do Sul (BR); Ademaro Marchiori, Rio de Janeiro (BR); Jorge Roberto Duncan Lima, Rio de Janeiro (BR); Roberto Ruva, São Mateus do Sul (BR); Marcelle Vensão Camargo Foschiani, São Mateus do Sul (BR); Alinson Francisco Geros, São Mateus do Sul (BR)

(73) Assignee: Petróleo Brasileiro S.A. - Petrobras, Rio de Janeiro (BR)

( * ) Notice: Subject to any disclaimer, the term of this patent is extended or adjusted under 35 U.S.C. 154(b) by 368 days.

(21) Appl. No.: 12/249,488

(22) Filed: Oct. 10, 2008

(65) Prior Publication Data
US 2009/0134063 A1    May 28, 2009

(30) Foreign Application Priority Data
Oct. 10, 2007   (BR) .................................... 0703901

(51) Int. Cl.
*B01J 8/02* (2006.01)
*B01J 8/04* (2006.01)
*C10G 47/36* (2006.01)
(52) U.S. Cl. ........................................ 422/195; 422/220
(58) Field of Classification Search ............... 422/195
See application file for complete search history.

(56) References Cited

U.S. PATENT DOCUMENTS

| | | | |
|---|---|---|---|
| 2,632,692 A | 3/1953 | Korin et al. | |
| 2,898,292 A | 8/1959 | Halik et al. | |
| 3,112,256 A | 11/1963 | Young et al. | |
| 3,172,832 A | 3/1965 | Dreyer et al. | |
| 3,218,249 A | 11/1965 | Ballard et al. | |
| 3,235,344 A | 2/1966 | Dreyer et al. | |
| 3,353,924 A | 11/1967 | Riopelle | |
| 3,592,612 A | 7/1971 | Ballard et al. | |
| 3,824,080 A | 7/1974 | Smith et al. | |
| 4,126,540 A | 11/1978 | Grosboll et al. | |
| 4,140,625 A * | 2/1979 | Jensen | 422/220 |
| 5,462,719 A | 10/1995 | Pedersen et al. | |
| 6,613,219 B2 * | 9/2003 | Harter et al. | 422/220 |

OTHER PUBLICATIONS

Ross, "Performance of trickle bed reactors", *Chemical Engineering Progress*, vol. 61, No. 10, 1965, pp. 77-82.
Hoftyzer et al, "Liquid Distribution in a Column with Dumped Packing", *Trans. Instn Chem. Engrs.*, vol. 42, 1964, p. T109-T117.
Schiesser et al., "Further Studies of Fluid Flow and Mass Transfer in Trickle Beds", *A.I.Ch.E. Journal*, vol. 7, No. 1, Mar. 1961, pp. 163-171.

* cited by examiner

*Primary Examiner* — Glenn Caldarola
*Assistant Examiner* — Randy Boyer
(74) *Attorney, Agent, or Firm* — Nixon & Vanderhye PC

(57) ABSTRACT

The present invention relates to a device and respective process for distribution of mixed charges comprising a flat tray in the form of a disc drained by a series of drainage tubes located above the surface of fixed beds of catalysts, capable of promoting the homogenisation and distribution of charges by means of said device.
Such drainage tubes mounted in said manner have the objective of restricting and reorienting the flow of mixed charges, multiplying the points whereon they fall, principally of the liquid phase, onto said beds of catalysts. For the purpose of doing so said drainage ducts, being segments of tubes, distributed on the entire surface of said tray possess caps affixed at the upper extremity thereof impeding the direct flow of charge onto the bed of catalyst, creating a reservoir of liquid on the tray, subsequently being drained down such device in a more controlled manner.

14 Claims, 5 Drawing Sheets

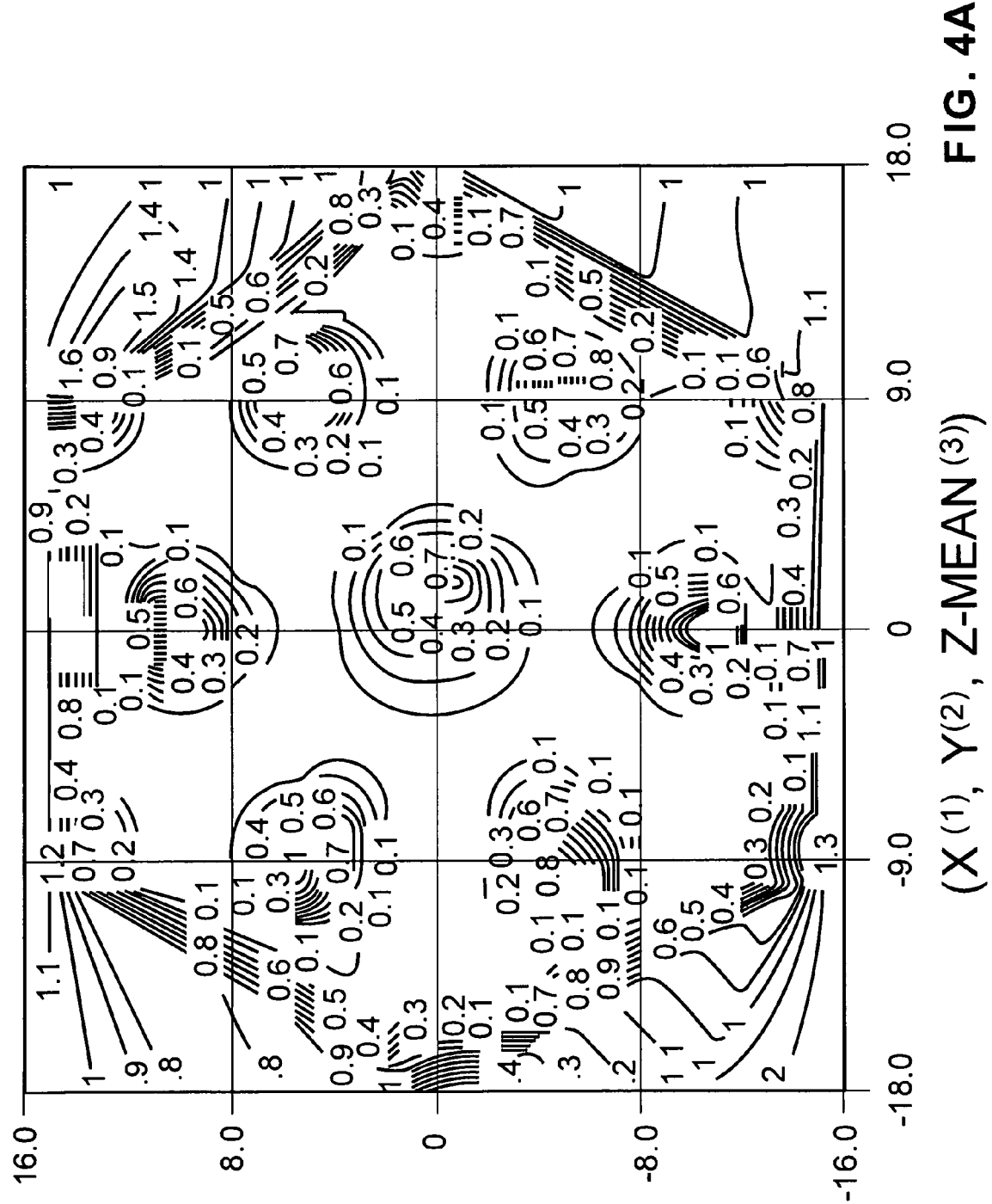

DEVICE AND PROCESS FOR DISTRIBUTION OF MIXED CHARGES ONTO FIXED BEDS OF CATALYST IN DESCENDING-FLOW REACTORS

FIELD OF THE INVENTION

The present invention relates to a device and process of distribution of mixed charges containing liquid and gaseous phases onto fixed beds of catalyst in descending-flow reactors.

BACKGROUND OF THE INVENTION

Processes of petroleum refining, of chemical treatment and of production of organic compounds are well known wherein reagents in different phases, liquid and gaseous, are premixed and input into vertical reactors to react with one another during their passage in a continuous and descending flow through one or more layers of granular solid catalysts supported on permeable trays, intercalated in the vertical sense within such reactor, denominated fixed beds of catalysts.

Among petroleum-refining processes employing this technique are processes known as hydrotreatment, hydrogenation, dehydrogenation, hydrocracking, in addition to others. All thereof are processes generating exothermic reactions, the reagents whereof generally being liquid or partially-vaporised hydrocarbons and gaseous hydrogen.

For example, in a typical hydrocracking process a charge of liquid hydrocarbons of high molecular weight and initial boiling point (IBP) in a band from 320° C. to 390° C. is premixed with gaseous hydrogen and subsequently injected into the top of a typical vertical reactor, such as that schematically represented in FIG. 1 accompanying the present specification.

The charge flows down the reactor and on passing continuously through fixed beds of catalyst it reacts with itself generating lighter hydrocarbons having molecular weights in the diesel band (IBP approximately 30° C.) or in the petrol band (IBP approximately 100° C.), depending on the degree of severity imposed on the process.

With the objective of such exothermic reactions occurring in an efficient manner during such passage of charge through the fixed beds of catalyst it is fundamental: firstly, that the gaseous phase (hydrogen) remain well-mixed with the liquid phase (hydrocarbons) to ensure maintenance of the designed stoichiometric ratio of the reagents and, secondly, that said charge be uniformly distributed onto the surfaces of the fixed beds of catalyst. Uniform distribution prevents the formation of preferential routes, or hot points, which pass around (bypass) parts of the catalyst present in said beds, whilst overloading others, experiencing higher acceleration of catalyst deactivation due to coke formation.

To address said two process requirements simultaneously is a complex task insofar as, not only is there a natural tendency towards separation of the phases of the charge, but in addition preferential flows, or channelling, tend to form in a random manner without apparent reason.

The art teaches employment of devices called distribution trays to resolve said aforementioned problems. Installed between charge inlet locations and the surfaces of the fixed beds, and occupying the entire transverse cross-section of the reactor, such devices were initially simple perforated plates, the function whereof was the creation of a protective shield which would not only prevent the charge falling onto a single point of the catalytic bed but which was also capable of distributing the flow of charge radially by means of diverse orifices. Such increase in the number of points of arrival of the charge on such beds of catalysts improves the distribution of the charge onto the bed.

Currently the majority of said devices basically comprise trays having the most varied forms installed in the same manner and locations as said perforated plates however, in contrast to orifices, being drained by means of several small dykes, similar to flues, assuming innumerable configurations. Said devices, in general tubular and provided with a cap having lateral apertures, allow gas to pass preventing the direct passage of liquid, it being partially retained on such tray forming a level reservoir, it subsequently overflowing, cascading within said tubular dykes together with the gas, promoting further contact between the two phases and better distribution of charge onto the surface of the catalytic beds.

Appearance of said new device increased the efficacy of the process by virtue of the more prolonged contact between the gaseous phase and the liquid phase retained on the trays, enhancing the homogeneity of the charge, however requirements for improvement in the technique of distribution of the latter were still necessary.

RELATED ART

Various patents describing different types of liquid distributor have been presented over the years, the majority thereof being based on teachings provided by pioneer researchers such as SCHIESSER and LAPIDUS, AICHEJ, v.7 p. 163 (1961); HOFTZER, "Trans. Instn. Chem. Engrs." V.24, T109 (1964) and ROSS, "Chem. Engr. Progress, v.61; # 10, 77 (1965).

One of the earliest devices for distribution of liquid and homogenisation of mixed charges to be utilised in hydrotreatment reactors was a perforated-plate distributor containing a series of flues for the passage of vapour. As described in U.S. Pat. No. 2,632,692, said device permitted passage of liquid through the orifices of the plate whilst the gas passed through flues promoting, in theory, good charge distribution.

In practice said device left much to be desired insofar as its operation was compromised by any unlevelness of the plate and orifice blocking caused by corrosion, coke, or any other fragments conveyed within the reactor together with the charge.

In U.S. Pat. No. 2,898,292 another device of the perforated-plate type is described wherein in the perforations were inserted weirs (downcomers) by means whereof liquid and vapour flowed together. In addition "charge distribution channels" were installed below such weirs to prevent turbulence caused by interference by gas in the descent of liquid. The device presented the same operational problems as stated above.

A further similar device was described in U.S. Pat. No. 3,112,256 constituted by perforated plates having weirs wherein in this case such weirs possessed a cap, draining laterally, to prevent the direct provision of liquid to the bed of catalysts, simultaneously permitting passage of vapour through lateral openings. Such cap had the same function as the distribution channels cited in the previous document, this being the prevention of turbulence in the descent of liquid in contact with the flow of gas.

The problems caused by unlevelness remained, aggravated by details of the complexity of assembly of the devices.

It was commencing with devices described by U.S. Pat. No. 3,235,344 and U.S. Pat. No. 3,172,832 that problems relating to possible unlevelness of distribution trays began to be addressed. In said inventions the trays are constituted exclusively by flues, drained laterally, to permit the simultaneous flow of liquid and gas, whereby from this fact the weirs present orifices in their sides permitting an additional route for the liquid. Such lateral orifices tend to eliminate poor distribution caused by unlevelness of the plate as it now no longer depends on the liquid level reaching all the flues in an equal manner. An additional detail of said inventions is a basket to retain deposits, located on the upper part of such tray, demonstrating concern regarding ingress of residues possibly carried by charges and which may obstruct the lateral orifices, hindering the performance of the device.

Comparison of the performance of such new tray-type devices with the previous perforated-plate types, wherein flues were solely responsible for passage of the gas, the number of flues became fundamental by virtue of the fact that in such cases the greater the number of flues the greater the number of points of distribution of liquid.

A new design of liquid distributors made its appearance in the literature with the invention described in U.S. Pat. No. 3,218,249, introducing so-called bubblers (bubble caps) on liquid-distributing trays in descending-flow reactors.

Such device is similar to bubblers widely used in petroleum distillation columns, however having a different operating principle. In the present case the gas passes through the lateral apertures of such bubblers and solely enters the flue weir to descend together with the descending liquid, subsequent to passing through the short liquid column (pool) on such trays. This promotes effective liquid/gas contact, contributing to maintaining homogeneity of the charge without prejudice to distribution of the liquid, and offering efficiency gains for the overall process.

Various other devices are presented in patents subsequently filed such as, for example, those described in U.S. Pat. No. 3,353,924, U.S. Pat. No. 3,592,612, U.S. Pat. No. 3,218,249 and U.S. Pat. No. 3,824,080, also serving to clearly delineate the structure of the state of the art of the device to which the present invention relates.

U.S. Pat. No. 4,126,540 and U.S. Pat. No. 5,462,719 in addition constitute important technological improvements in the art, describing trays comprising bubblers similar to those hereinabove described, however provided with orifices in the sides of said bubblers disposed vertically at three different levels, each thereof having different diameters. Such disposition of orifices provides greater flexibility in respect of variations in liquid/gas ratio and problems of plate unlevelness.

The inventors teach that it is important that the orifices having differentiated diameters be designed following the right criteria such as to maintain the liquid at the desired level, the ideal being that the diameter of the orifice at the lowest level be smaller than the remainder such as to achieve the maintenance of a suitable level of liquid in the tray, even with very low liquid rates (high gas/liquid charge).

Consequently analysis of the current state of the art indicates the existence of a large number of types of devices and processes for homogenisation and distribution of charges consisting of mixed phases, such as that referred to in the present invention. In the present case the continuous improvement in the efficiency of the same is closely allied to the fact of new inventions incorporating or sharing modifications of proven success from previous inventions, thus producing new devices and processes having ever-improved performance.

According to that described below the invention now proposed presents an innovative device and process, of performance comparable to the best already known, utilising complementary techniques of flow direction based on laboratory practices never before incorporated into such devices, additionally being of easy manufacture and assembly.

SUMMARY OF THE INVENTION

The present invention relates to a device for distribution of mixed charges containing liquid and gaseous phases onto fixed beds of catalyst in descending-flow reactors comprising a flat tray, in disc form, drained by a series of drainage tubes located above the surface of fixed beds of catalysts, and the process of homogenisation and distribution of charges by means of said device.

In the centre of the caps of the drainage tubes there is affixed a metal rod passing through the internal centre of the same, the end thereof being joined to a deflector cone having the function of final distribution of the charge which drains onto such fixed beds.

The distribution process now comprises premixing the phases composing the charge and injecting it into the reactor such as to divide and direct said charge to the periphery of the surface of such distribution device, preventing the occurrence of a unilateral stream direct onto a single point of said device.

Process conditions allied with specific device configurations bring about the passage of the mixed charge by means of the same such that free gas descends through lateral ports of the caps of said drainage ducts, the liquid retained in the tray descending through the orifices of the tubes of each of the various drainage tubes or, ultimately, overflowing the upper walls of such tubes should said orifices not achieve drainage of the liquid prior thereto.

The flow of liquid is then attracted and directed by the rigid rod to the deflector cone located at the lower extremity thereof, the latter then providing ideal final distribution of the liquid onto the fixed bed of catalyst.

BRIEF DESCRIPTION OF THE DRAWINGS

The device and process for distribution of mixed charges containing liquid and gaseous phases onto fixed beds of catalyst in descending-flow reactors, objects of the present invention, shall be duly explained by means of the following detailed description, having as its basis the drawings referred to below, forming an integral part of the present specification.

FIG. 4A contains graphs showing curves of level of distribution of liquid onto such fixed bed, generated through measurement of mean drainage rates of liquid discharged by each of such drainage ducts onto the central section of a distribution device commercially-available on the market, installed in a pilot plant for evaluation of the performance of distributor plates.

DETAILED DESCRIPTION OF THE INVENTION

The detailed description of the device and process of distribution of mixed liquid/gas charges onto fixed beds of catalyst in descending-flow reactors, subject of the present invention, shall be provided based on the figures in conformity with the identification of the respective components therein.

Figure 1:
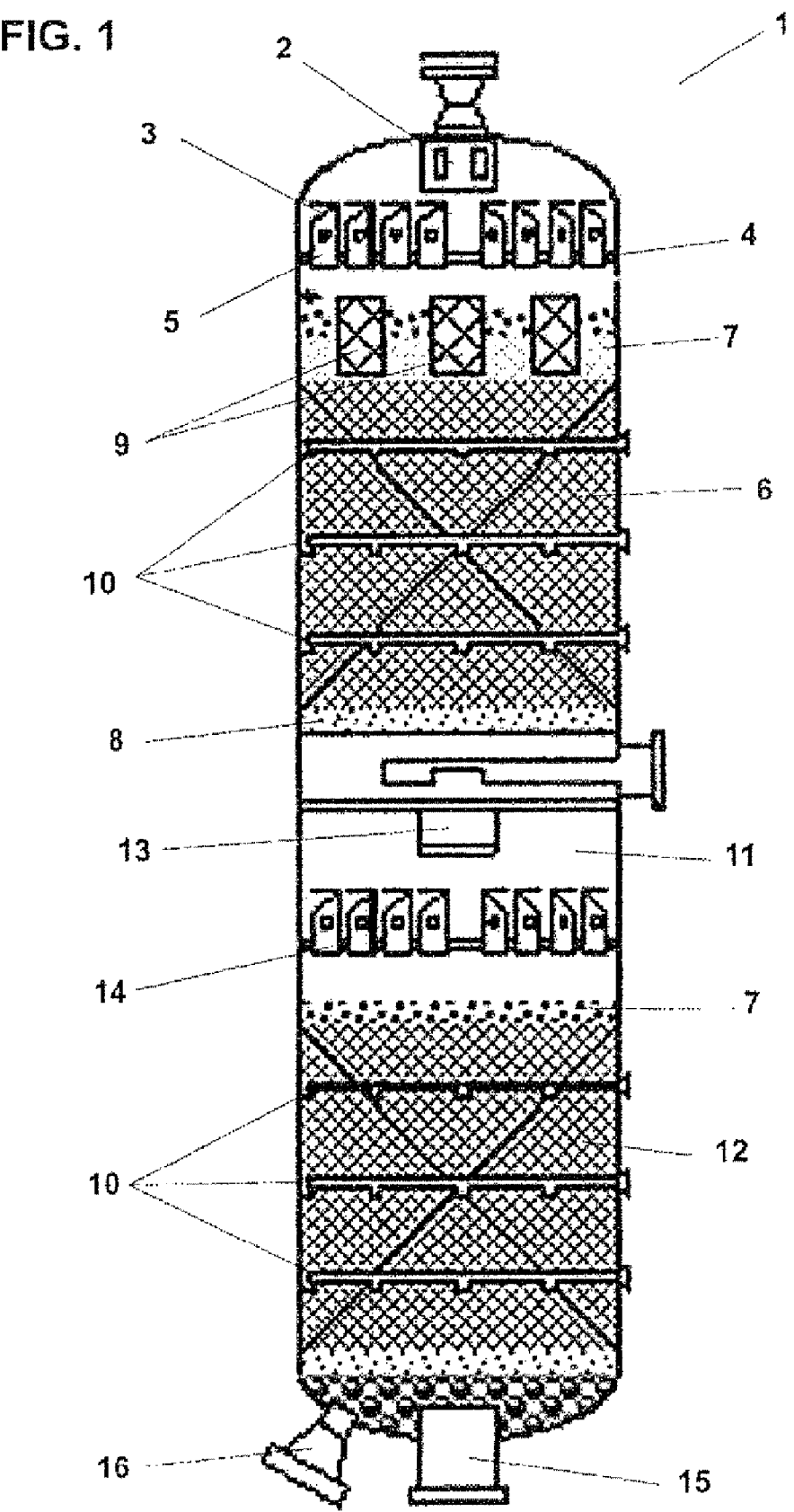
FIG. 1 shows a schematic representation of a typical descending-flow reactor provided with fixed beds of catalyst, known in the literature as a trickle-bed reactor.

FIG. 1 shows a schematic representation of a typical descending-flow reactor (1) having fixed beds of catalysts wherein a mixed charge containing a liquid (for example hydrocarbons of high molecular weight) and a gas (for example hydrogen) is premixed prior to being fed into the top of said reactor (1) by means of central charge injector (2) and of mixed charge distribution device (3), subject of the present invention.

Such central charge injector (2) disperses said mixture peripherally onto a flat tray (4) in the form of a disc whereon are mounted drainage tubes (5). Below said flat charge distribution tray (4) is located a first bed (6) of granular solid catalysts (upper bed), these being separated by two layers (7, 8) of chemically-inert spherical solid balls, wherein in such first layer (7) it is common for porous baskets (9) to be inserted, also filled with inert particulate ceramic material.

The function of said layers (7, 8) is to contribute towards uniform charge distribution onto the bed of catalysts, said baskets (9) fulfilling the task of retaining possible extraneous particles arising with such charge which may block the bed of catalysts.

Located within wells (10) within the bed of catalyst are thermocouples (not shown in the Figure) measuring the temperatures in the beds, making possible control of the exothermic reactions which occur therein during passage of the charge.

Below said second layer (8) of solid balls is located the reaction "buffer" chamber (11), or quench chamber, situated between two adjacent beds. Reactions occurring in the first upper bed (6) being highly exothermic it is necessary to protect the following bed (12), or adjacent beds, from excessive heat generated above. Typically such buffering is achieved by injection of a cold gas into the reactor, in the present case hydrogen, realised by means of the so-called quench panel (13) which, in order to appropriately carry out such task, requires to promote optimum gas distribution, horizontally or radially, across the entire cross-sectional surface of such reactor immediately beneath the charge flowing from said upper bed (6).

Such mixture of gas and liquid is maintained whilst making the charge pass through a second distribution device (14) similar to the first thereof, located immediately below said quench panel (13), and flow therethrough to reach the surface of the following bed (12) as uniformly as it did from the first upper bed (6). The final product is collected by product drain (15) in the lower part of the reactor, as is also realised by catalyst drain (16) to collect exhausted catalyst.

Figure 2:
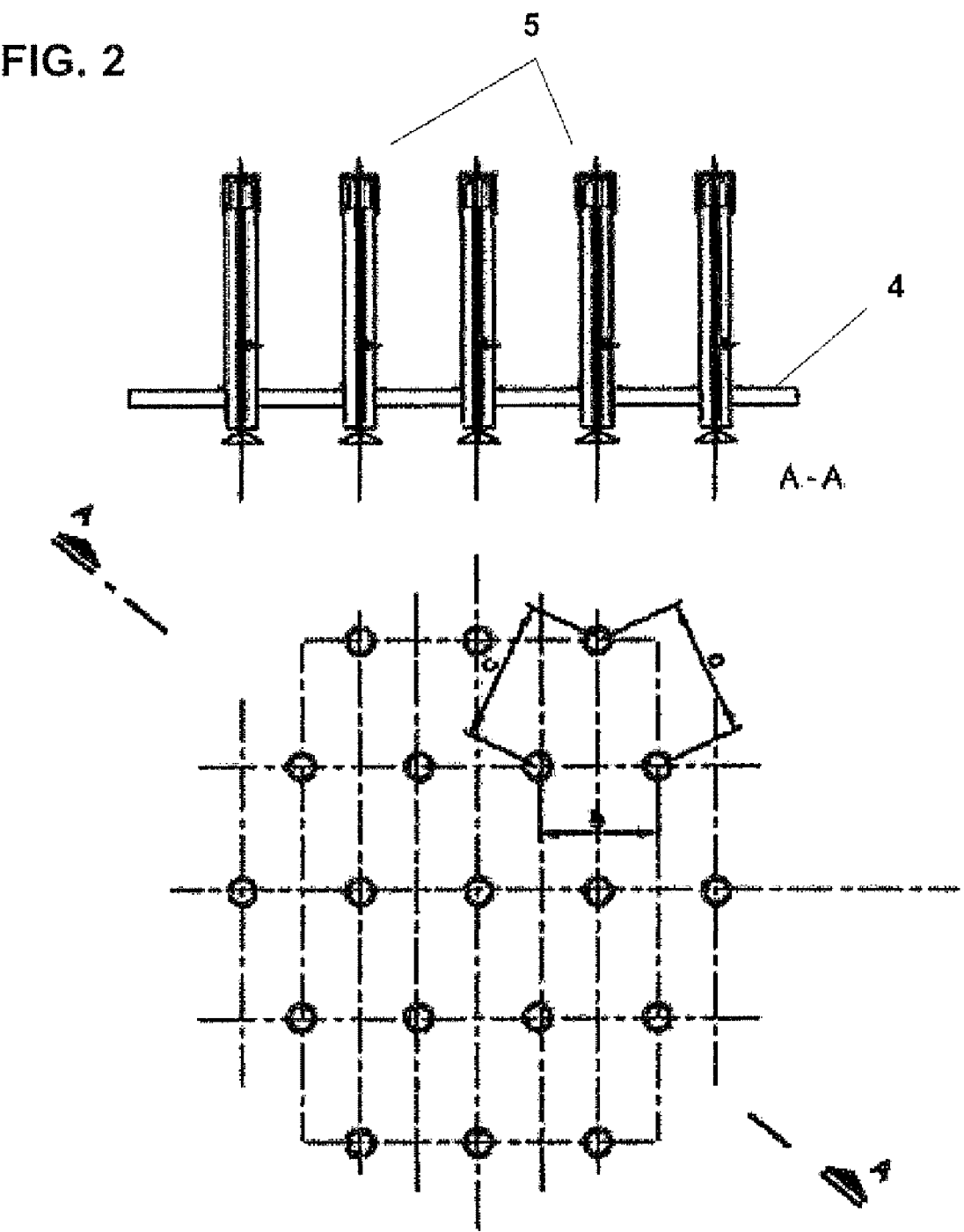
FIG. 2 shows a schematic representation of the disposition of the drainage ducts affixed on the tray supporting them and a cross-sectional view of the same along line A-A.
Figure 3:
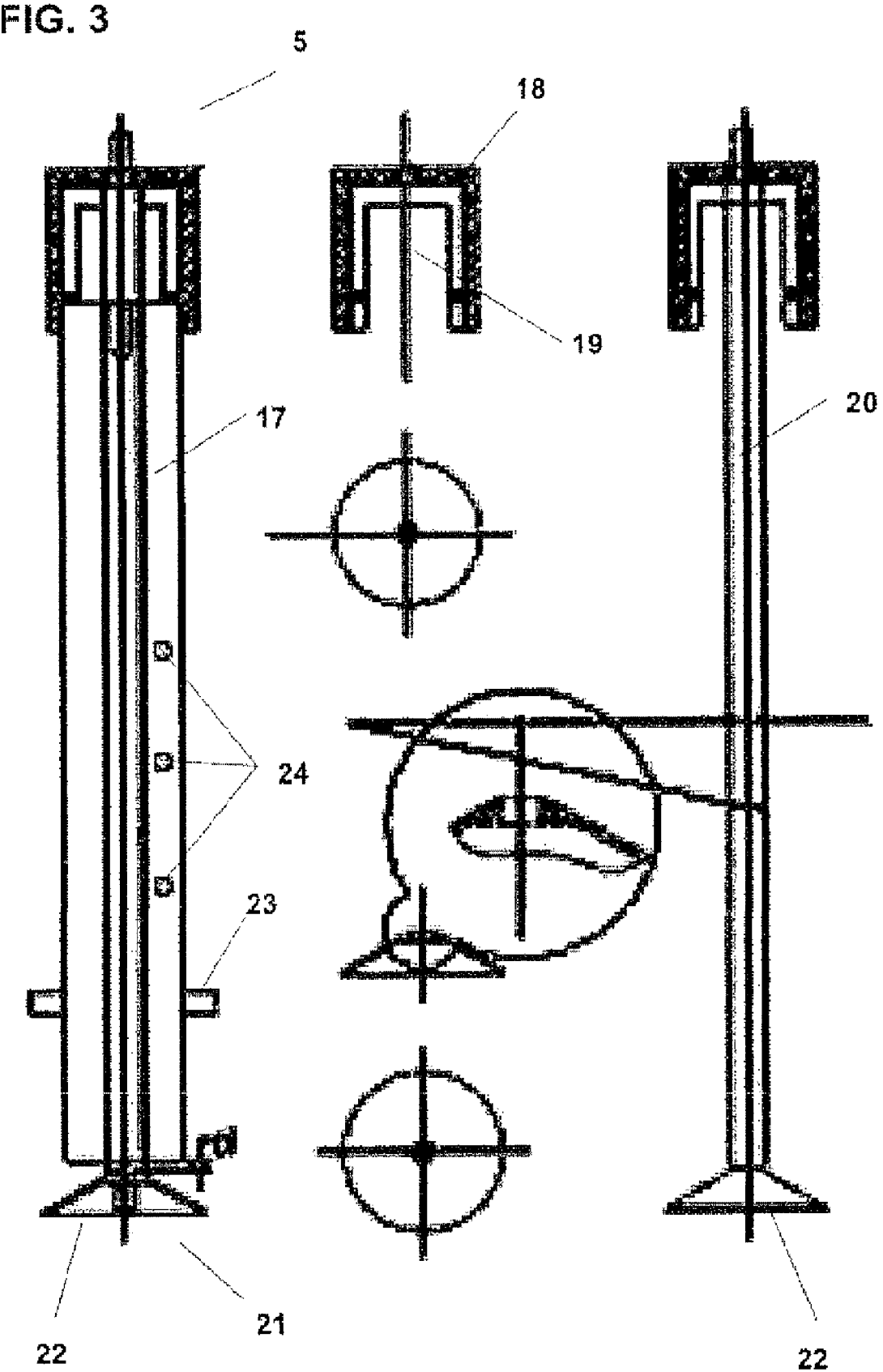
FIG. 3 shows a frontal cutaway view of such drainage duct and schematic details of the interior thereof.

FIGS. 2 and 3 show a possible embodiment of the present invention. On the entire surface of said flat tray (4) in the form of a disc located above the surface of said fixed beds of catalysts there are affixed drainage tubes (5) such that the configuration thereof is in accordance with that shown in cross-section A-A of FIG. 2.

The number of drainage tubes (5) may range from 50 to 200, however preferentially lying between 100 and 150 per $m^2$ of tray area. The internal diameter of such drainage tubes (5) may range from 10 to 50 mm, however it preferentially lies between 15 and 30 mm.

To achieve the effect of uniform distribution it is necessary that adjacent drainage tubes (5) be installed with a given uniform disposition, a triangular disposition however being preferred wherein they are mounted on flat tray (4) as if at the vertices of an equilateral triangle or an isosceles triangle, as shown in the plan view of cross-section A-A of FIG. 2. It is noted that the type of triangular disposition is defined by distances a, b and c, which may be equal (in the case of equilateral triangular disposition), two thereof equal and the third different (in the case of isosceles triangular disposition), or all thereof being different.

Distances between centres of such drainage tubes (5) to be affixed to the surface of the tray (4) may range from 4 to 10 times the measurement of the internal diameter of drainage tubes (5), preferentially approximately 5 to 8 times the measurement of diameter.

The device for distribution of mixed charges (3), subject of the present invention, comprises a flat tray in the form of a disc drained by a series of drainage tubes located above the surface of fixed beds of catalysts, promotion of homogenisation and distribution of charges being possible by means of said device.

Such drainage tubes installed in said manner have the objective of restricting and reorientating the flow of mixed charges, multiplying the points of falling whereof, principally the liquid phase, onto the beds of catalysts. To achieve this such drainage ducts, being segments of tubes distributed across the entire surface of said tray, possess caps affixed at the upper extremity thereof preventing direct flow of such charge onto such bed of catalyst, creating a reservoir of liquid above said tray, being subsequently drained down the device in a more controlled manner.

Such smoothing of flow of the liquid retained on the tray is promoted by one or more orifices in the lateral walls of such tubes, being vertically aligned and intercalated from the bases of said tubes in contact with the surface of the tray up to the upper edge thereof. In addition thereto such caps covering said drainage ducts are drained by lateral ports through which pass simultaneously liquid which may overflow said tray when such lateral apertures do not provide sufficient drainage flow, and the gas.

FIG. 3 shows drainage tube (5) in frontal cutaway view. As may be observed drainage tube (5) comprises a segment of tube (17) open at both extremities thereof, having a cap (18) drained by lateral ports (19) affixed at the upper extremity thereof, in the centre at the lower extremity whereof there being attached a rigid rod (20), preferentially cylindrical, which may however have a square or rectangular cross-section, the diameter (or thickness) whereof ranging within a band from ¼ to ½ of the internal diameter of tube (17), preferentially ¼.

To the opposite extremity of rigid rod (20) there is joined a straight deflector cone (21), solid or hollow, the generator whereof forms an angle with base (22) which may range from 15 to 70 degrees, preferentially lying between 30 and 45 degrees. The base diameter of such cone depends on the angle adopted for the generation thereof, but should lie between 2 and 15 cm greater than the external diameter of tube (17).

The function of said rigid rod (20) is specifically to receive and direct both overflowing liquid and liquid passing through the orifices of segments of tube (17) to the vertex of said deflector cone (21) installed at the lower extremity thereof.

In the walls of segments of tube (17) of drainage tube (5) there are also supports (23) for the mounting thereof on said flat tray, in addition to at least one pair of circular orifices (24) disposed in a diametrically-opposed manner and vertically distanced from the surface of flat tray (4).

The quantity and diameter of circular orifices (24) together with the height thereof, both in relation to said tray and one to another, depends on operational process conditions and therefore should be specified such as to provide the charge distribution profile, as shall be described below. In the same manner distance y between the lower extremity of tube (17) and deflector cone (21) should be adjusted to promote the rain effect onto the catalyst bed, such consideration also being a function of the operational conditions of the process.

In operation said device for distribution of mixed charges of the present invention—an assembly constituted by flat tray (4) and drainage tube (5)—is installed above beds of catalysts (6, 12) through which such charge requires to be distributed. Typically the surface of said device for mixed charge distribution (3) is located between approximately 10 and 50 cm above such beds, preferentially from 20 to 30 cm. The liquid part of the mixed charge to be distributed falls onto said device, being initially deflected by caps (18) of drainage tubes (5), preventing direct passage through tube segments (17) of drainage tubes (5) and commences accumulation on tray (4) until a given level of liquid is obtained, the height whereof is determined by the process conditions.

Liquid then passes through the device by means of circular orifices (24) in the walls of said drainage tubes (5) and, possibly, also through lateral ports (19) of caps (18), by overflowing the wails of tube segments (17). On so doing the liquid encounters rigid rod (20) within tube segments (17) and remains adhered thereto through surface tension whilst descending to the lower extremity of rigid rod (20), where it encounters the vertex of cone (21) which receives and disperses such flow, thus producing more disseminated dropping onto said bed. Such function of rigid rod (20) is fundamental in the present process of distribution of charge because, lacking the same, the effect of dispersion of the liquid would not be as efficient, it being a matter of the same phenomenon of the use of a glass rod in laboratory pipetting techniques. The gas flows through lateral ports (19) of cap (18) maintaining maximum contact with the liquid phase, completing the process of homogenisation and distribution of the charge.

The device of the present invention may be manufactured from any suitable type of metallic material, depending on the application for which it is destined. In the majority of cases metals and metal alloys such as iron, carbon steel, stainless steel or similar may be employed. Only materials which affect or may be affected by fluids under process conditions such as, for example, temperature and pressure, should not be utilised.

Drainage tube element (5) having central rigid rod (20) introduces an additional advantage on comparison with other elements cited in the state of the art, insofar as facilitating the mechanics of manufacture and assembly of said device in the case of requiring to proceed to possible minimisation of the free discharge space of the ducts, or of the levels of restriction existing therein towards the outflow of gas and liquids. That is to say, should charge distribution require optimisation, it becomes easier to modify the configuration of said drainage tubes (5) by virtue of the fact that, according to teachings of the state of the art, the greater the restriction on discharge of flows the better the final distribution obtained. It is also known that loss of pressure caused by such restrictions is considered negligible in the majority of known applications.

The present invention shall now be illustrated by an example which, however, shall not be considered as being limiting thereof but demonstrating that the objectives of the invention have been fully achieved.

Example

Pilot plant tests have been carried out wherein the efficiency of a distribution device of known design and available on the market was compared with the efficiency of the device of the present invention under identical conditions of operation.

Said tests were carried out under the basic conditions described below.

A mixture of water and air was disposed such as to descend each of the devices under test Water was provided at a surface velocity of 16 cm/s, the air having a surface velocity of 13 cm/s (at 25° C. and 1 kg/cm$^2$ absolute pressure).

The following configuration was employed in the device of the present invention:

a) isosceles triangular disposition for draining from flat tray (4) through drainage tubes (5), the smallest distance (b) and the greatest distance (a) between centres of diameters of segments of tube (17) being respectively equal to 5.8 and 6.3 times the internal diameter of said tubes, providing a device having the equivalent of 120 drainage tubes per square metre of tray;

b) total length of segments of tubes (17) equal to 25 cm, having two lateral circular orifices (24) of 0.62 cm, mutually 6 cm distant, the lower orifice being located 3 cm from the surface of flat tray (4);

c) cylindrical rods (20), having diameters equal to ¼ of the internal diameters of said tubes, terminating in solid deflector cones (21) having base diameters 10 cm greater than the internal diameter of such drainage tubes and an angle of 30° to the bases (22) thereof, distance (y) between the lower extremity of tube (17) and deflector cone (21) being equal to 2 mm.

Figure 4B:
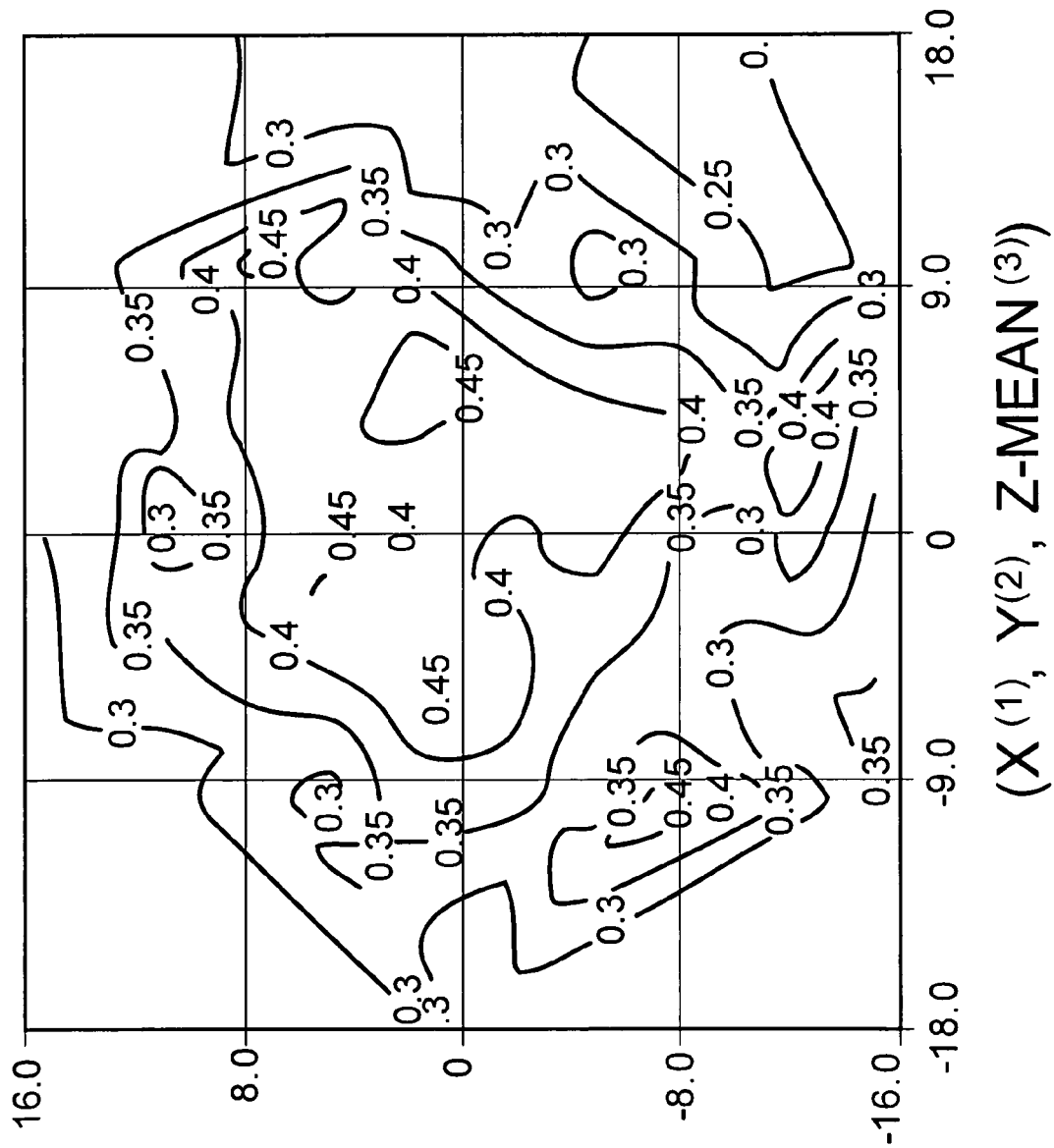
FIG. 4B contains graphs showing curves of level of distribution of liquid onto such fixed bed, generated through measurement of drainage rates of liquid discharged by each of such drainage ducts onto the central section of the device and process of distribution of the present invention, installed in a pilot plant for evaluation of the performance of distributor plates.

The degree of distribution of water through drainage tubes (5) of said two devices tested was measured at the cross-section of the bed by means of 120 individual measuring drainage devices and drawn up in graph form. The smallest distance (b) corresponds to the "X" axis, the greatest distance (a) corresponds to the "Y" axis, whilst the mean drainage discharge corresponds to the "Z" axis. The results obtained are presented in bidimensional images similar to contour lines, shown in the graphs of FIG. 4.

It may be observed that the left-hand graph (FIG. 4A), displaying the results obtained with a reference device existing on the market, shows seven diffuse circles formed by almost concentric curves whereon the water flows measured are plotted.

This graph simulates "high points" or small "hillocks" under the seven drainage tubes (5), signifying that liquid distribution onto the beds of catalysts is very concentrated under the ducts being, therefore, irregular.

However the right-hand graph (FIG. 4B), displaying the results obtained with the device of the present invention, does not show any circles; the modelling simulates something having the nature of a "plain", lacking high points denoting concentrations of descending flow at specific points as described previously, proving more uniform distribution of the liquid descending onto the bed of catalysts.

The invention claimed is:

1. Device for distribution of mixed charges onto fixed beds of catalyst in descending-flow reactors comprising a flat tray (4) in disc form located above the surface of fixed beds of catalysts (6, 12) drained by a series of drainage tubes (5) distributed on the entire surface of said flat tray (4) in a uniform disposition, characterised in that drainage tubes (5) comprise segments of tube (17) open at both extremities, having cap (18) drained by lateral ports (19) affixed in the upper extremity thereof, and in the centre thereof at its internal extremity there is secured a rigid rod (20); at the opposite extremity of said rigid rod (20) there is connected a straight deflector cone (21), solid or hollow, the generator whereof forms an angle with its base (22) which may range from 15 to 70 degrees; the distance y between the lower extremity of such segments of tube (17) and said deflector cone (21) being adjustable.

2. Device for distribution of mixed charges onto fixed beds of catalyst in descending-flow reactors according to claim 1 characterised in that additionally in the wall of segments of tube (17) of drainage tube (5) there are supports (23) for mounting thereof on flat tray (4), in addition to at least one pair of circular orifices (24) disposed in a diametrically-opposed manner and vertically distanced from the surface of flat tray (4).

3. Device for distribution of mixed charges onto fixed beds of catalyst in descending-flow reactors according to claim 1 characterised in that said rigid rod (20) receives and directs both overflowing liquid and liquid passing through circular orifices (24) of segments of tube (17) to the vertex of said deflector cone (21) installed at the lower extremity thereof.

4. Device for distribution of mixed charges onto fixed beds of catalyst in descending-flow reactors according to claim 1 characterised in that adjacent drainage tubes (5) are installed in any uniform disposition, preferentially triangular dispositions, wherein they are mounted on flat tray (4) as if located at the vertices of an equilateral triangle or an isosceles triangle.

5. Device for distribution of mixed charges onto fixed beds of catalyst in descending-flow reactors according to claim 1 characterised in that the distances between centres of drainage tubes (5) affixed to the surface of flat tray (4) range from 4 to 10 times the internal diameter measurement of segments of tube (17) of drainage tubes (5), preferentially from approximately 5 to 8 times such diameter measurement.

6. Device for distribution of mixed charges onto fixed beds of catalyst in descending-flow reactors according to claim 1 characterised in that the internal diameter of segments of tube (17) of drainage tubes (5) ranges from 25 mm to 75 mm.

7. Device for distribution of mixed charges onto fixed beds of catalyst in descending-flow reactors according to claim 6 characterised in that the internal diameter of segments of tube (17) of drainage tubes (5) ranges preferentially from 15 mm to 30 mm.

8. Device for distribution of mixed charges onto fixed beds of catalyst in descending-flow reactors according to claim 1 characterised in that the number of circular orifices (24) of tube segments (17) preferentially ranges between one and three.

9. Device for distribution of mixed charges onto fixed beds of catalyst in descending-flow reactors according to claim 1 characterised in that rigid rod (20) is of circular, square, rectangular or mixed cross-section.

10. Device for distribution of mixed charges onto fixed beds of catalyst in descending-flow reactors according to claim 9 characterised in that rigid rod (20) is preferentially of circular cross-section.

11. Device for distribution of mixed charges onto fixed beds of catalyst in descending-flow reactors according to claim 10 characterised in that the thickness of rigid rod (20) ranges from ¼ to ½ of the internal diameter of segment of tube (17).

12. Device for distribution of mixed charges onto fixed beds of catalyst in descending-flow reactors according to claim 1 characterised in that the structure of deflector cone (21) is preferentially solid.

13. Device for distribution of mixed charges onto fixed beds of catalyst in descending-flow reactors according to claim 1 characterised in that the number of drainage tubes (5) affixed on the surface of flat tray (4) ranges within a band from 50 to 200 per m$^2$.

14. Device for distribution of mixed charges onto fixed beds of catalyst in descending-flow reactors according to claim 13 characterised in that the number of drainage tubes (5) affixed on the surface of flat tray (4) ranges within a band from 50 to 200, preferentially from 100 to 150 per m$^2$.

* * * * *